(No Model.) 2 Sheets—Sheet 1.
W. T. BACKUS, Jr.
APPARATUS FOR RESWEATING TOBACCO.
No. 370,846. Patented Oct. 4, 1887.
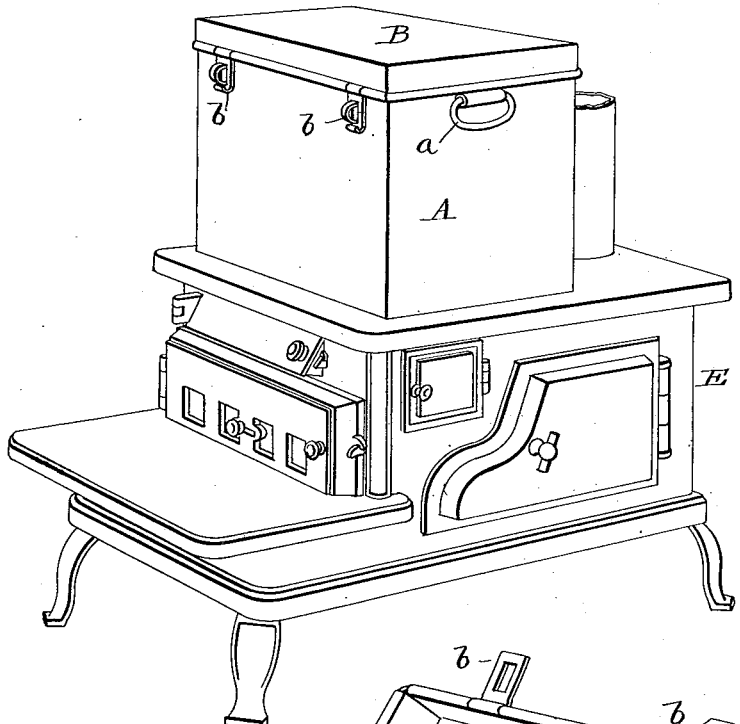
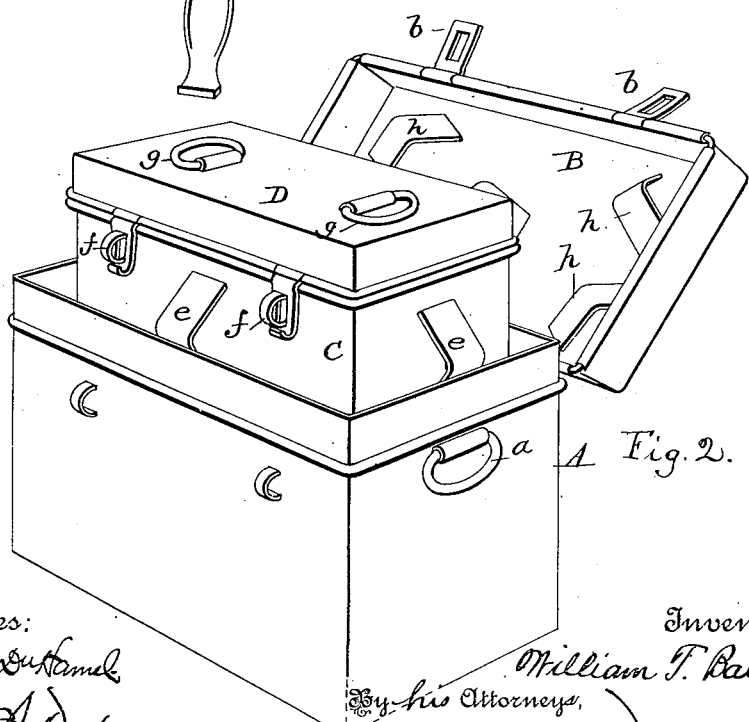
Witnesses:
James P. DuHamel
Walter S. Dodge
Inventor:
William T. Backus Jr.
By his Attorneys,
Dodge & Sons (No Model.) 2 Sheets—Sheet 2.

W. T. BACKUS, Jr.
APPARATUS FOR RESWEATING TOBACCO.

No. 370,846. Patented Oct. 4, 1887.

Witnesses
James F. DuHamel
Walter S. Dodge

Inventor
William T. Backus Jr.
By his Attorneys
Dodge & Sons

UNITED STATES PATENT OFFICE.

WILLIAM THOMAS BACKUS, JR., OF PORTSMOUTH, VIRGINIA.

APPARATUS FOR RESWEATING TOBACCO.

SPECIFICATION forming part of Letters Patent No. 370,846, dated October 4, 1887.

Application filed July 20, 1887. Serial No. 244,821. (No model.)

*To all whom it may concern:*

Be it known that I, WILLIAM THOMAS BACKUS, Jr., of Portsmouth, in the county of Norfolk and State of Virginia, have invented certain new and useful Improvements in Apparatus for Resweating Tobacco, of which the following is a specification.

My invention relates to the resweating of leaf tobacco, and has reference to a novel construction of an apparatus for efficiently and thoroughly coloring and generally improving the quality of the tobacco.

Figure 3:
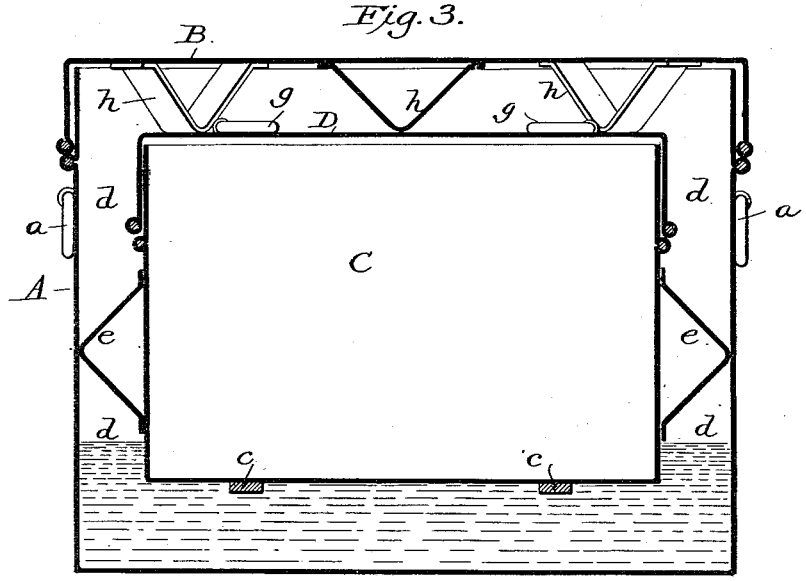

In the drawings, Figure 1 represents my resweating apparatus applied to an ordinary stove; Fig. 2, a perspective view showing the inner case or receptacle partially removed from the kettle or boiler; Fig. 3, a vertical longitudinal central sectional view through the apparatus, and Fig. 4 a vertical transverse sectional view.

My invention has reference more particularly to that class of resweating apparatus in which the tobacco is securely packed within a metallic box or chamber, which latter is in turn inserted into a larger kettle, in which steam is generated.

No claim is made herein to the method of curing or resweating tobacco, as this has been long and quite extensively used, the present invention relating solely to a novel construction of the apparatus by which the method alluded to may be more efficiently carried out than under other constructions of which I am aware.

A indicates the kettle or boiler, which in the drawings is represented as being of rectangular form; but it is apparent that the said kettle may be circular or hexagonal or of any other desired form. The kettle A is provided with a bail or handle, *a*, at opposite ends, and with a hinged lid or cover, B, which is kept closed by means of fastenings *b*, of any suitable construction, as shown in Figs. 1, 2, and 3.

Secured within the kettle A are two or more narrow cross-bars or supports, *c*, (shown clearly in Figs. 3 and 4,) upon which rest the resweating-box C. The box C is similar in form to but smaller than the kettle A, so that when placed within the latter and resting upon the cross-bars or supports *c* there will be a chamber or space, *d*, between the inner walls of kettle A and the outer walls of box C.

It is desired that the space or chamber *d* should be of approximately the same width or size upon all sides of the box C, in order that the tobacco within the box shall be acted upon equally and uniformly throughout, and thereby prevent undue discoloration of some portions and insufficient coloration of other portions of the tobacco. To accomplish this I provide the box C on its sides and ends with arms or projections *e*, which may preferably be made of a piece of tin bent into A form and soldered or otherwise secured at its ends to the box C. The exact construction and form of these arms is of course a matter capable of considerable variation, and while it is found that the construction shown in the drawings answers the purpose for which it is intended, I do not wish to be understood as limiting myself to any particular form or construction of these arms.

The arms *e*, projecting from the sides and ends of box C, bear upon the inner walls of the kettle A, and as they project equally from all sides of the box they serve to center the latter within the kettle, and thereby secure the equal space or chamber *d* at the ends and sides of the box. The bars or supports *c* are so located that when the box C is in position and resting upon them the space beneath the box will be approximately the same as the space at the sides and ends.

The box C is provided with a hinged top or cover, D, which is kept closed by means of fastenings *f*, which may be of any suitable construction, the said box being also provided with bails or handles *g*, by which it may be lifted out and removed from the kettle A.

Figure 4:
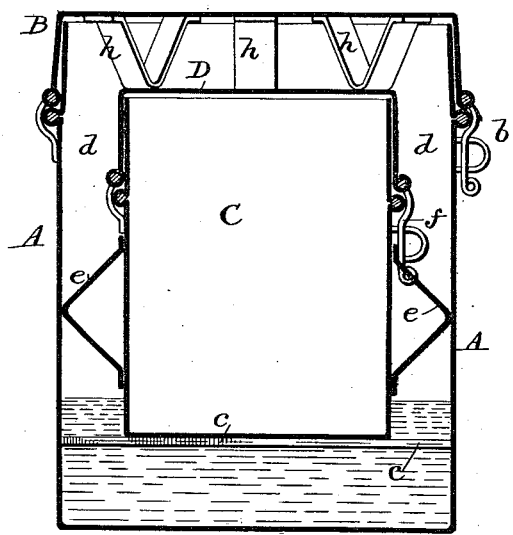

After the box C is filled with tobacco and its cover closed, it is inserted within the kettle A and rests upon the supports *c c* near the bottom of the latter. Water is then placed within the kettle A up to a point a slight distance above the supports *c c*—say about one-third of the height of the kettle. The water in the kettle would tend to raise the box C off the supports or bars *c*, and to prevent this I provide the cover B of the kettle A with a series of arms or projections, *h*, which, when the cover is closed, rest or bear upon the top of the box C, as shown in Figs. 3 and 4, and thereby keep the box in position upon the bars or supports. These arms or projections *h* will preferably be constructed in the same manner as the arms or projections formed upon the sides of the box C, and they will, by preference, also be of the same height as said arms, in order that there may be the same space above the box C that there is at the sides and bottom thereof. When the box C is filled with tobacco and securely fastened in position within the kettle A, and the latter provided with the required amount of water, the apparatus is set upon a heater, E, of any desired form or construction, which in the drawings is represented as an ordinary heating-stove. Heat being applied, it causes the water within the kettle to boil, and the steam and moisture rise upon all sides of the box or chamber C and cause the tobacco within the latter to sweat uniformly and thoroughly.

The construction or form of heater E is a matter capable of considerable variation and forms no part of my invention.

With the apparatus constructed as above set forth, it will be found necessary to allow the tobacco to remain within the box C only from three to six hours, according to the color desired, thereby effecting a considerable saving in time.

The apparatus herein described is exceedingly simple and cheap in construction, and is found to work well in practice, the uniform or equal spacing on all sides of the box C contributing materially to the good results secured.

Having thus described my invention, what I claim is—

1. In combination with the kettle A, provided with the supporting-bars $c$ and the cover B, box C, mounted within the kettle A and resting upon the supports $c$, and the arms or projections secured to the under side of the cover B and adapted, substantially as shown, to bear upon the top of the box C, as and for the purpose set forth.

2. The herein-described resweating apparatus, comprising a kettle, A, having cross-bars or supports $c$ and a hinged cover, B, provided on its under face with arms or projections, and a box, C, provided with arms or projections on its sides and ends and adapted to fit within the kettle A and to rest upon the cross-bars $c$, all substantially as shown and described.

In witness whereof I hereunto set my hand in the presence of two witnesses.

WILLIAM THOMAS BACKUS, Jr.

Witnesses:
 JAMES R. CARSON,
 J. V. HUDGINS.